United States Patent [19]

Gustafson et al.

[11] Patent Number: 4,952,810
[45] Date of Patent: Aug. 28, 1990

[54] DISTORTION FREE DEWAR/COLDFINGER ASSEMBLY

[75] Inventors: Kenneth L. Gustafson, Pollock Pines; Timothy S. Romano; Nevil Q. Maassen, both of Goleta; Donald E. Salzer, Santa Barbara, all of Calif.

[73] Assignee: Santa Barbara Research Center, Goleta, Calif.

[21] Appl. No.: 397,710

[22] Filed: Aug. 23, 1989

[51] Int. Cl.$^5$ .............................................. G01J 5/06
[52] U.S. Cl. ..................................... 250/352; 62/51.1; 228/221
[58] Field of Search ........... 228/221; 250/352, 370.15; 62/51.1, 51.2

[56] References Cited

U.S. PATENT DOCUMENTS

| | | | |
|---|---|---|---|
| 3,570,110 | 3/1971 | Zdanuk | 228/221 |
| 3,719,990 | 3/1973 | Long et al. | |
| 3,851,173 | 11/1974 | Taylor et al. | 250/352 |
| 4,190,106 | 2/1980 | Dunmire | 250/352 |
| 4,528,449 | 7/1985 | Gordon et al. | 250/352 |

*Primary Examiner*—Carolyn E. Fields
*Attorney, Agent, or Firm*—W. C. Schubert; W. K. Denson-Low

[57] ABSTRACT

An infrared detector assembly (10) of the type used in munitions and night vision systems having an improved coldfinger assembly (42). Such detector assemblies (10) include a tubular coldfinger (22) which is surrounded by a vacuum and an end-cap (28) mounted to the coldfinger tube (22) to define a cold end (24) which supports the infrared detector array (30) and related components. In accordance with this invention, the coldfinger tube (22) is a thin-walled titanium cylinder and the end-cap (28) is made of tungsten. The components are metallurgically bonded at the cold end (24) by an active brazing alloy deposited during vacuum furnace brazing. The titanium coldfinger (22) provides the necessary bending stiffness to support cold end components. The tungsten end-cap (28) provides a low distortion, thermally stable focal-plane. The metallurgical bond (46) provides for a hermetic seal which inhibits structural distortion during brazing, and during cyclical cooling of the detector assembly (10).

17 Claims, 1 Drawing Sheet

DISTORTION FREE DEWAR/COLDFINGER ASSEMBLY

BACKGROUND OF THE INVENTION

1. Field of the Invention

This invention relates to an improved infrared seeker assembly and particularly to one having an improved coldfinger assembly construction.

2. Discussion

Infrared detection systems are often used in conjunction with munitions and night vision systems for sensing electromagnetic radiation in the wavelength range of one to fifteen micrometers. Because many such detection systems have detector arrays which are most sensitive when operated at about 80° K., a cooling system is required to produce and maintain the required low operating temperatures. Typically, such cooling systems either take the form of a cryostat operating using the Joule-Thompson effect, or a Stirling cycle cryoengine. the cooling systems are used in conjunction with an evacuated dewar in which the infrared detector is placed. The dewar is evacuated to remove thermally conductive gases which would otherwise occupy the area surrounding the detector so that potential heat loss through convection and conduction is minimized. The evacuated dewar also prevents moisture from condensing on the detector. The infrared detector is typically cooled by placing an indented region ("coldwell") of the dewar in contact with an expansion chamber ("coldfinger") of the cryogenic cooling system. The coldfinger is a cylindrical tube having an end which is cooled and which supports the detector and related components. The cooling systems produce cyclical cooling by sequential compression of a working fluid such as helium, removal of the heat generated during compression of the working fluid, and subsequent expansion of the working fluid within the coldfinger. Thermal energy is withdrawn from the detector through the optical mounting platform ("end-cap") which is in thermally conductive communication with the coldfinger. Since the detector is in thermal communication with the coldfinger, expansion of the working fluid within the coldfinger cause thermal energy to be withdrawn from the detector.

In order to produce efficient conductive withdrawal of thermal energy from the infrared detector, the end-cap on which the detector is mounted must be fabricated from a material possessing specific metallurgical properties. Ideally, these properties include high strength, a high modulus of elasticity and high thermal conductivity. Additionally, the end-cap material must be capable of being permanently bonded to a thin-walled tubular coldfinger to produce a low distortion, hermetically sealed coldfinger assembly.

A number of design constraints affect the design of the dewar/coldfinger assembly. Since the coldfinger tube is a cantilever supported cylinder, it must have sufficient bending stiffness to control deflection of the infrared detector. Such requirements become particularly significant when the infrared seeker assembly is used as part of munitions subjected to intense vibrations and high levels of boost-phase acceleration. Another significant design parameter is the extent to which heat is transferred from the warn end of the coldfinger cylinder to its cold end. Reductions in heat transfer rate allow the capacity of the cryogenic cooling system to be reduced. Unfortunately, reductions in the cross-sectional solid area of the coldfinger tube for reducing heat transfer adversely affects its bending stiffness for a given material and tube diameter. Another design consideration is the cool-down rate for the cold end components of the coldfinger assembly. Since infrared seekers are often used in expendable munitions which must acquire a target soon after (or before) their launch, cool-down time becomes a critical consideration for some applications.

Prior art dewar/coldfinger tubes have been formed from various materials. Glass has been used since it has low thermal conductivity, but, unfortunately, does not yield low conductance coldfingers because it is too fragile when it is made in decreased thicknesses desired to minimize conduction heat loads. Examples of such glass dewar coldfingers are described by U.S. Pat. Nos. 3,851,173 and 3,719,990. Other art coldfingers have been made form various metals, for example, as described by U.S. Pat. No. 4,528,449. Meals are less fragile than glass but often cannot be made thin enough to obtain lower heat loads than glass due to their higher thermal conductivity. Plastic materials have also been used for non-evacuated detector units and have obtained low heat loads. However, due to their porosity, plastic coldfingers have not been effectively used in vacuum type dewars without the need to electroplate a thin metallic skin over the exterior surface of the tube.

SUMMARY OF THE INVENTION

A dewar/coldfinger assembly for use in an electromagnetic detector assembly is disclosed. The dewar/coldfinger assembly comprises a hollow coldfinger tube made from titanium. The assembly also comprises an end-cap, made from tungsten, which supports the detector and which is configured to enclose one end of the coldfinger. A metallurgical bond secures the end-cap to the coldfinger tube to provide a hermetic seal therebetween.

BRIEF DESCRIPTION OF THE DRAWINGS

Various advantages of the present invention will become apparent to one skilled in the art upon reading the following specification and references to be drawings in which.

DETAILED DESCRIPTION OF THE PREFERRED EMBODIMENTS

The ultimate material for end-cap fabrication is pure tungsten. Tungsten has a thermal coefficient of expansion which closely parallels that of commonly fabricated hybrid detectors operating at cryogenic temperatures. This provides for a relatively distortion-free mounting platform resistance to thermal distortion is critical to inhibit premature contact bump failure of hybrid detector during thermal cycling.

The combination of the tungsten end-cap and a coldfinger fabricated from thin-walled titanium tubing produces superior thermal stability and conductivity characteristics during cyclical operation of the cryogenic cooling systems. Thin-walled titanium tubing provides the requisite stiffness and structural strength while providing low thermal conductivity. However, previous efforts to metallurgically bond these materials have proven unsatisfactory because of their inherent reactive tendencies encountered during common welding or brazing methods. Additionally, the inability to produce a hermetic metallurgical bond without dimensionally distorting the end-cap/coldfinger assembly has severely limited pas efforts to use tungsten as an end-cap material.

Because of the previous difficulties in metallurgically bonding titanium and tungsten, inferior materials have been utilized for end-cap fabrication. Alternatively, attempts have been made to non-metallurgically bond tungsten end-caps and titanium coldfingers by applications of adhesives. Both alternatives however, produce inferior life and serviceability results under cyclic cryogenic temperature conditions. These alternatives hinder the efficient flow of thermal energy from the infrared detector into the coldfinger thereby mandating utilization of the cryoengine assembly having a greater cooling capacity than would otherwise be necessary. Even worse, inferior end-cap materials produce an excessively high rate of hybrid detector failure during thermal cycling since excessive thermal distortion of the end-cap causes delamination of sensitive detector contacts and surfaces. Tungsten's ability to provide a relatively distortion-free mounting surface for the detector greatly reduces such premature failure.

Figure 1:
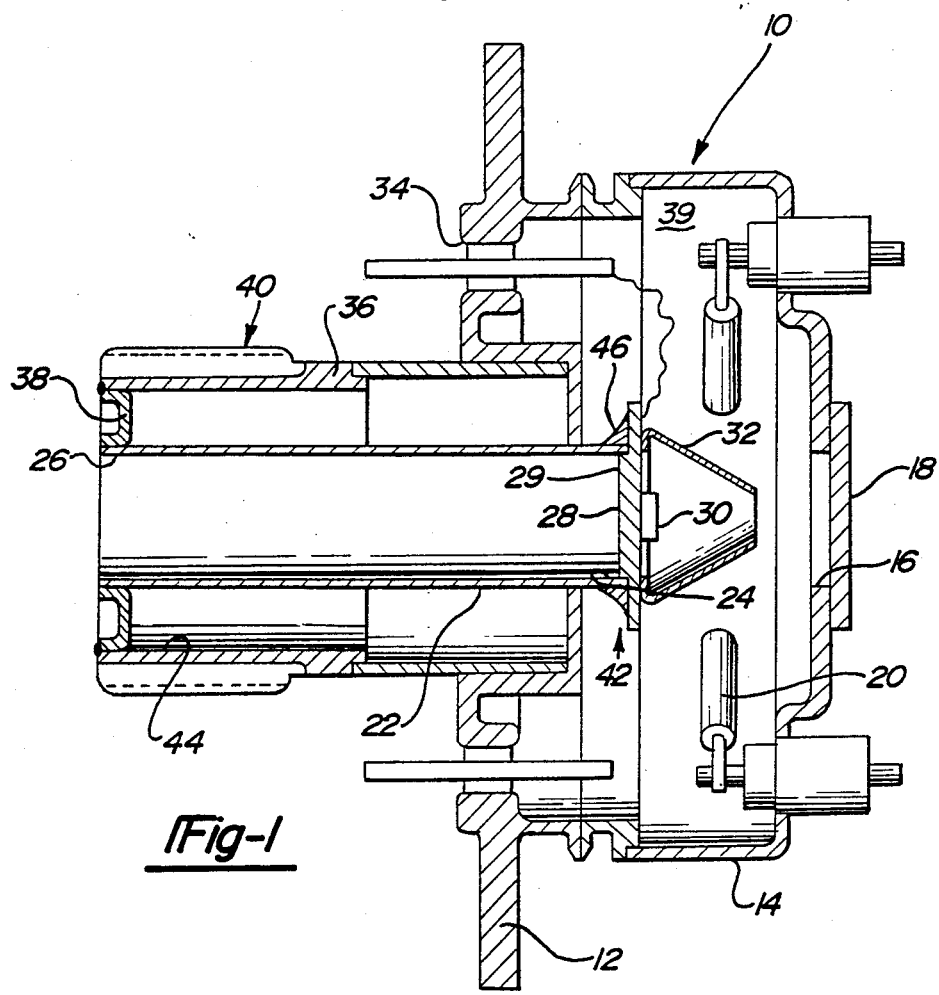
FIG. 1 is a cross-sectional view of an infrared detector assembly equipped with an improved dewar coldfinger assembly in accordance with this invention.

An infrared detector assembly in accordance with the present invention is shown in FIG. 1 and is generally designated there by reference number 10. Detector assembly 10 is secure to a supporting structure by mounting flange 12. Dewar housing 14 encloses the forward end of the device and has a central aperture 16 covered by infrared window 18. Getters 20 are provided to absorb any outgas materials which escape into the interior cavity of housing 14. Preferably coldfinger 22 is a hollow right circular cylindrical tube defining cold end 24 and warn end 26 (referring to their temperatures during use). As mentioned previously, a cryogenic cooling system is installed in association with coldfinger 22 to produce the necessary low temperatures at cold end 24. Cold end 24 is enclosed by end-cap 28 which provides an optical platform upon which an infrared detector 30 is mounted. End-cap 28 is preferably disc-shaped so as to have a low thermal mass and high thermal conductivity. The detector 30 is secured to end-cap 28 by a thermally conductive adhesive, which permits thermal energy to flow from the detector. It is contemplated that any electromagnetic detector, or hybrid thereof, capable of receiving infrared radiation and generating a responsive electrical signal can be readily used with this invention. Detector 30 is enclosed by cold shield 32. Wiring associated with detector 30 penetrates mounting flange 12 at feed-through ports 34. Detector assembly 10 has a double wall construction to minimize heat transfer to coldfinger cold end 24. Outer tube 36 fits over coldfinger 22 and its rear-most end is sealed by circular flange 38 thereby defining an enclosed dewar assembly 40.

Referring to FIG. 1, the improved dewar coldfinger assembly 42 is illustrated in accordance with the first preferred embodiment of the present invention. Coldfinger assembly 42 comprises coldfinger 22 fabricated from thin-walled titanium tubing and end-cap 28 which is fabricated from tungsten. Coldfinger 22, longitudinally disposed within coldwell 44 of the dewar assembly 40, receives thermal energy from the detector 30. The tungsten end-cap 28 is positioned to enclose the cold end 24 of coldfinger 22. Coldfinger 22 is metallurgically bonded to the end-cap 28 prior to installation into the detector assembly 10. Metallurgical bond 46 hermetically seals the end-cap 28 to the cold end 24 of coldfinger 22 to provide a strong, thermally conductive bond which preserves vacuum integrity within dewar cavity 39.

Receiving thermal energy form the dewar assembly 40 and the detector 30 is the coldfinger 22. Thermal energy is withdrawn from the infrared detector 30 and the dewar assembly 40 by the cyclical expansion of a working fluid contained inside the coldfinger 22. By cooling the detector 30 in this manner, the detector 30 is able to operate at a temperature where it is most sensitive. The thermal energy withdrawn from the infrared detector 30 is communicated through the end-cap 28 and subsequently withdrawn from the end-cap 28 into the working fluid within the coldfinger 22. The tungsten end-cap 28 has a coefficient of expansion substantially identical to that of typical hybridized detectors thereby allowing thermal energy to effectively and efficiently propagate between the coldfinger 22 and the infrared detector 30 without generating excessive thermal distortion.

In practicing the method of the present invention the titanium coldfinger 22 and tungsten end-cap 28 are positioned and positively located in close proximity. The environment surrounding the end-cap 28 and coldfinger 22 is evacuated to produce an oxygen-free vacuum condition. Thereafter, the environmental temperature is elevated to at least about 1750° F. at which the coldfinger 22 and end-cap 28 are metallurgically conductive to vacuum brazing. It should be understood that the stated temperature is nonlimiting and should be construed to include a range of temperatures capable of permitting nonreactive, low distortion welding of tungsten and then-walled titanium tubing. Upon achieving the elevated temperature uniformly throughout their structure, the coldfinger 22, and the end-cap 28, are metallurgically bonded by the deposition of an active brazing alloy. The brazing alloy produces a hermetic bond between the end-cap and cap and coldfinger which will maintain its integrity during thermal cycling. The brazing alloy further provides for stable thermal conductive communication between the end-cap and the coldfinger 22. A nonlimiting example of a brazing alloy capable of utilization comprises an alloy of Ag 71.5 Cu 28 Ni 0.5 Ti.

The evacuated environment and elevated temperature, associated with vacuum furnace brazing, are necessary to avoid the reactive tendencies of both tungsten and titanium with elements typically present during ambient brazing or welding operations. The utilization of tungsten for the end-cap 28 also provides superior distortion resistance over other end-cap materials which occurs during metallurgical joining processing.

The tungsten end-cap 28 provides a focal-plane having increased thermal stability and conductivity for improved transfer of thermal energy from he detector 30 to the cold end 24 of coldfinger 22. The hermetically sealed bond 46 provides for efficient maintenance of the vacuum with the dewar assembly 40 and increased thermal energy transfer from the infrared detector 30 through the end-cap 28 to the coldfinger 22. It will be apparent from the foregoing the present invention permits the utilization of materials possessing independently superior metallurgical properties in combination to produce superior performance capabilities over conventionally accepted and adopted material alternatives.

Figure 2:
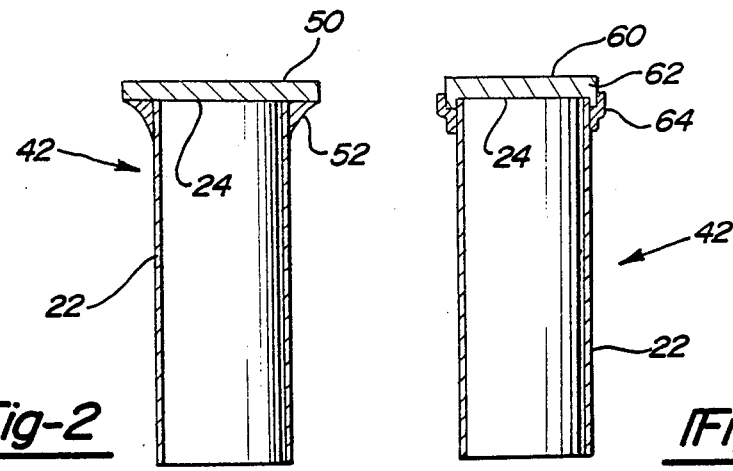
FIG. 2 is a longitudinal cross-section of a dewar coldfinger assembly in accordance with a second preferred embodiment of the present invention.
Figure 3:
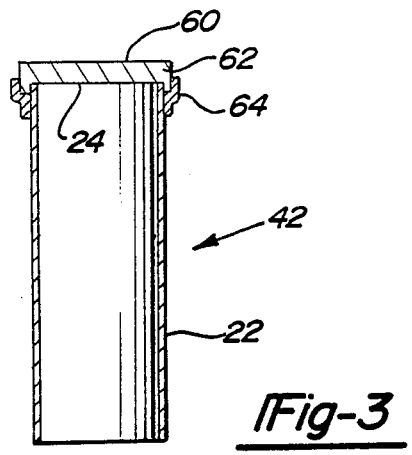
FIG. 3 is a longitudinal cross-section of a dewar coldfinger assembly in accordance with a third preferred embodiment of the present invention.

One preferred approach for metallurgically bonding end-cap 28 onto coldfinger tube 22 is described with reference to FIG. 1. End-cap 28 has a lower radial shoulder 29 having an outer diameter slightly smaller than the inner diameter of the cold end 24 of coldfinger tube 22. As shown, end-cap 28 is positioned on cold end 24 and vacuum furnace brazed to provide the metallurgical bond 46. FIG. 2 shows another embodiment for the construction of coldfinger assembly 42 in which end-cap 50 has a lower surface which abuts the end surface of cold end 24. Metallurgical bond 52 provides the hermetic seal between end-cap 50 and coldfinger 22. Additionally, FIG. 3 shows another alternate embodiment for the construction of coldfinger assembly 42 in which end-cap 60 includes a flange 62 which has an inner diameter that is slighter greater than the outer diameter of the cold end 24 of coldfinger tube 22. Metallurgical bond 64 provides the hermetic seal between the end-cap 60 and coldfinger 22.

Those skilled in the art can appreciate that other advantages can be obtained for the use of this invention and that modifications can be made without departing form the true spirit of the invention after studying the specification, drawings and following claims.

What is claimed is:

1. An infrared detector assembly comprising:
   a dewar housing providing an evacuated cavity;
   a titanium coldfinger tube within said dewar housing, said tube having a cold end;
   cooling means for cooling said cold end of said titanium coldfinger tube;
   a tungsten end-cap having a first surface defining a planar mounting platform and a second surface configured to enclose said titanium coldfinger tube at said cold end;
   a metallurgical bond between said tungsten end-cap and said titanium coldfinger tube;
   an infrared detector mounted to said first surface of said tungsten end-cap; and
   said titanium coldfinger tube providing strength for supporting said detector, said tungsten end-cap providing thermal conductivity between said coldfinger tube and said infrared detector, and said metallurgical bond providing a hermetic said for preserving the integrity of said evacuated cavity.

2. An infrared detector assembly according to claim 1 wherein said cooling means is a cryogenic cooling system operable to provide a source of thermal energy to cool said infrared detector.

3. An infrared detector assembly according to claim 1 wherein said titanium coldfinger tube is a titanium right circular cylinder.

4. An infrared detector assembly according to claim 1 wherein said tungsten end-cap is fabricated from substantially pure tungsten.

5. An infrared detector assembly according to claim 1 wherein said metallurgical bond comprises an active brazing alloy material.

6. An infrared detector assembly according to claim 5 wherein said active brazing alloy material comprises a silver-nickel-copper-titanium alloy.

7. An infrared detector assembly according to claim 1 wherein said second surface of said tungsten end-cap has an inwardly extending radial shoulder having of said cold end.

8. An infrared detector assembly according to claim 1 wherein said second surface of said tungsten end-cap is substantially parallel to said first surface, said second surface in abutting contact with said cold end.

9. An infrared detector assembly according to claim 1 wherein said second surface of said tungsten end-cap has inwardly extending peripheral flange having an inner diameter greater than an outer diameter of said cold end.

10. An infrared detector assembly comprising:
    a dewar housing providing an evacuated cavity;
    a titanium coldfinger tube within said dewar housing, said tube having a cold end;
    coding means for cooling said cold end of said titanium coldfinger tube;
    tungsten end-cap having a first surface defining a planar mounting platform and a second surface configured to enclose said titanium coldfinger tube at said cold end;
    a metallurgical bond between said tungsten end-cap and said titanium coldfinger tube;
    an infrared detector mounted to said first surface of said tungsten end-cap; and
    said titanium coldfinger tube providing strength for supporting said detector, said tungsten end-cap providing thermal conductivity between said coldfinger tube and said infrared detector, and said metallurgical bond providing a hermetic seal for preserving the integrity of said evacuated cavity;
    wherein said metallurgical bond is produced in a vacuum environment at the elevated temperature, such that said tungsten end-cap and said titanium coldfinger tube are conducive to metallurgical bonding.

11. A method of making coldfinger assembly for an infrared detector assembly of the type wherein said coldfinger assembly has a cold end for supporting a detector which is located within an evacuated cavity, said method comprising the steps of:
    providing a coldfinger tube made of titanium;
    providing an end-cap made of tungsten and configured to enclose one end of said coldfinger tube thereby defining said cold end; and
    metallurgically bonding said end-cap to said coldfinger tube at said cold end wherein said metallurgical bond provides a hermetic, thermally conductive bond therebetween.

12. A method according to claim 11 further comprises the steps of:
    placing said tungsten end-cap and said titanium coldfinger tube in a furnace chamber capable of evacuation;
    aligning said tungsten end-cap and said titanium coldfinger tube so as to define said coldfinger assembly;
    evacuating said chamber;
    elevating the temperature of said tungsten end-cap and said titanium coldfinger tube within said chamber to about at least 1750° F.;
    contacting an active brazing alloy material with said cold end of said coldfinger assembly so as to metallurgically bond said end-cap to said coldfinger;
    reducing the temperature within said furnace chamber; and
    removing said coldfinger assembly from said chamber, whereby the resulting metallurgical bond provides for a low distortion coldfinger assembly.

13. A method according to claim 12 wherein said metallurgical bond is an active brazing alloy comprising an alloy of silver, nickel, copper and titanium.

14. A method for making an electromagnetic detector assembly, said method comprising the step of:
   providing a dewar housing defining an evacuated cavity;
   providing a hermetically sealed coldfinger assembly having a hollow coldfinger tube made of titanium and an end-cap made from tungsten, said end-cap being metallurgically bonded to said coldfinger tube so as to enclose a cold end thereof;
   mounting a detector to said end-cap on a surface opposite said coldfinger tube; and
   providing a source of thermal energy operable to cool said cold end of said coldfinger assembly whereby said end-cap and the metallurgical bond provide for thermally conductive communication between said detector and said source of thermal energy.

15. A coldfinger assembly for use in an electromagnetic detector assembly of the type having an evacuated dewar for cooling a detector positioned therein, comprising:
   a hollow coldfinger made from titanium;
   means for supporting said detector within said evacuated dewar, said supporting means made from tungsten and configured to enclose one end of said coldfinger;
   a metallurgical bond securing said supporting means to said coldfinger for providing a hermetic seal therebetween.

16. A coldfinger assembly according to claim 15 wherein said hollow coldfinger is a titanium tube.

17. A coldfinger assembly according to claim 16 wherein said supporting means comprises a tungsten end-cap, said end-cap providing a relatively distortion-free planar surface for supporting said detector within said evacuated dewar.

* * * * *